US007118011B2

(12) United States Patent
Proulx

(10) Patent No.: US 7,118,011 B2
(45) Date of Patent: Oct. 10, 2006

(54) FLUID DISPENSING APPARATUS

(75) Inventor: Stephen P. Proulx, Boxborough, MA (US)

(73) Assignee: Millipore Corporation, Billerica, MA (US)

( * ) Notice: Subject to any disclaimer, the term of this patent is extended or adjusted under 35 U.S.C. 154(b) by 9 days.

(21) Appl. No.: 10/823,171

(22) Filed: Apr. 13, 2004

(65) Prior Publication Data

US 2004/0256409 A1 Dec. 23, 2004

(51) Int. Cl.
*B67D 5/38* (2006.01)
*G01F 11/28* (2006.01)

(52) U.S. Cl. ........................ 222/64; 222/129; 222/158; 222/318; 222/424; 222/450; 222/462

(58) Field of Classification Search .................. 222/64, 222/129, 133, 155, 157, 158, 159, 318, 424, 222/450, 460, 462
See application file for complete search history.

(56) References Cited

U.S. PATENT DOCUMENTS 2,677,480 A * 5/1954 Wiczer ....................... 222/158
2,889,892 A * 6/1959 Schaub et al. ................ 55/432
3,607,100 A * 9/1971 Croom ....................... 422/100
3,760,981 A * 9/1973 Weed .......................... 222/14
5,344,231 A * 9/1994 Jonsson et al. ............. 366/137
5,480,063 A 1/1996 Keyes et al.
5,680,960 A 10/1997 Keyes et al.
6,024,251 A * 2/2000 Mayer et al. ................. 222/64

* cited by examiner

*Primary Examiner*—Joseph A. Kaufman
(74) *Attorney, Agent, or Firm*—Millipore Corporation

(57) ABSTRACT

A disposable tube set apparatus is provided for delivering a precise volume of a fluid to containers which comprise a reservoir for a fluid, an inlet conduit to the said reservoir, at least one first outlet conduits from the reservoir, a sight tube connected to each of the at least one outlet conduit, each of the sight outlet tubes having an interior wall tapered away from a central vertical axis of each of the sight outlet tubes, a return conduit connecting each of the sight outlet tubes to the reservoir, and a second outlet conduit connected to each of the sight tubes.

12 Claims, 5 Drawing Sheets

FLUID DISPENSING APPARATUS

BACKGROUND OF THE INVENTION

The present invention relates to fluid dispensing apparatuses, and more particularly to a volumetric fluid dispensing apparatus having no moving parts in contact with the fluid and which can deliver a wide range of volume of fluids.

Numerous types of fluid dispensing apparatuses exist for filling bottles. One type of fluid dispensing apparatus which is in widespread use is positive displacement fillers. Positive displacement fillers typically include moving parts which contact and displace the fluid being dispensed. For example, one type of positive displacement filler uses a piston and cylinder arrangement. In this type of positive displacement filler, the backward movement of the piston draws fluid into the cylinder through an inlet port and the forward movement of the piston expels the fluid through an outlet port. Another type of positive displacement filler uses a rotary pump to move the fluid.

Positive displacement pumps have gained widespread use in the United States for two reasons. First, positive displacement pump can operate at relatively high speeds, filling as many as six hundred bottles per minute. Additionally, positive displacement pumps are accurate up to about ±0.5%.

Despite the widespread use of positive displacement fillers, they nevertheless have several disadvantages. One disadvantage with positive displacement fillers is that the fluid comes into contact with moving parts. As the moving parts wear, particulate matter enters the fluid causing particulate contamination. If severe enough, particulate contamination can render the product unusable. Another disadvantage with positive displacement fillers involves the difficulty in cleaning and sterilizing the moving parts in contact with the fluid. In positive displacement pumps, the critical tolerances between pads, such as the piston and cylinder, preclude effective cleaning in place. Thus, the user must disassemble the apparatus for cleaning and sterilization. This process is not only time consuming, but may result in biological contamination of the pads when they are handled by the mechanic during reassembly.

It has been proposed in U.S. Pat. Nos. 5,480,063 and 5,680,960 to provide volumetric fluid dispensing apparatus which utilizes gravity rather than apparatus having moving parts in contact with the fluid being dispensed such a pump. A closed fluid chamber is provided in which the fluid level therein is sensed and maintained at a constant level. A fill tube in fluid communication with the fluid chamber for containing a desired volume of fluid is provided. Sensing apparatus which control valve apparatus is provided for filling the fill tube with a desired volume of fluid from the fluid chamber and subsequently dispensing the desired volume of fluid into a container such as a vial. In these apparatus, the top surface of the fluid being dispensed from the fill tube must be lower than the top surface of the fluid in the fluid chamber in order to effect dispensing of the desired fluid volume. Since the fill tubes disclosed in these patents have a constant inner diameter along their length, it has been found necessary to utilize a plurality of fill tubes of varying inner diameters in order to effect dispensing of a desired range of fluid volumes, e.g., 0.5 ml–20 ml. The use of a plurality of fill tubes in a single dispensing apparatus or a plurality of dispensing apparatus, each having a fill tube with a given constant diameter since such an arrangement is either needlessly complicated or needlessly expensive.

In the current system, the dispense volume repeatability is critical. This repeatability is expressed as a percent error of the fill volume. The error in the dispense volume is affected by the sight tube diameter at the sensor locations. The larger the inner diameter, the more volume/height of the tube. Since the sensors detect the level of the liquid and the inherent error in detecting the liquid level at the same location for consecutive dispenses results in different dispense volumes, it is preferred to have the inner diameter of the sight tube be small so that the volume/height ratio is small. This approach will result in the most repeatable fill volumes. As an example, having a sight tube with a 0.5 inch inner diameter the volume for every 0.001 inch of height is 0.0032 cc whereas a sight tube of 0.25 inch inner diameter will have a volume of 0.0008 cc for every 0.001 inch of height. For this reason one would want to have a small inner diameter sight tube for low volume dispense volumes. Likewise it will be beneficial to have larger inner diameter sight tubes for larger volumes for capacity and speed while the error may be larger in absolute volume but it will be small as a percentage of the fill. The tapered sight tube of this invention allows the filling of a wide range of volumes while maintaining the required repeatability since the sensors will be located at the preferred inner diameter for the required dispense volume.

Accordingly, it would be desirable to provide a fluid dispensing apparatus capable of accurately dispensing fluid over a wide volume range without the need for a plurality of fill tubes (with various inner diameters). Such an apparatus would simplify dispensing of fluids.

DESCRIPTION OF SPECIFIC EMBODIMENTS

In accordance with this invention, a fluid dispense system which can be disposable is provided for accurately dispensing desired fluid volumes into containers such as vials. The system includes sight tubes having tapered internal walls which receive fluid to be dispensed and from which a precise volume of fluid is dispensed into a container. The sight tube is capable of receiving and dispensing a plurality of fluid volumes sequentially. By the term "sight tube" as used herein is meant a tube that is sufficiently transparent so that a fluid level can be sensed at a lower portion of the sight tube by a first sensor positioned outside the sight tube and the top surface of a desired volume of the fluid can be sensed by a record sensor positioned outside the sight tube.

A sight tube having tapered inside walls which taper outwardly from a vertical center line in a direction from a lower portion of the sight tube to an upper portion of the sight tube. The sight tube configuration provides a number of advantages over a sight tube having a constant inner diameter. Since the sight tubes are filled with fluid by gravity from a reservoir, the top fluid surface in the sight tube cannot be above the top fluid surface in the reservoir. This condition limits the height of a sight tube having a constant diameter.

Furthermore, with sight tubes of varying diameter over a given length, the fluid travels a shorter vertical distance as compared to the same fluid volume in a constant diameter tube. Since the fluid in a varying diameter tube travels a shorter distance for a given volume, a lower pressure drop is effected in the sight tube of varying diameter. In addition, the fluid in the sight tube of varying diameter travels at a slower velocity when it reaches the desired height in the tube. As a result, (consistent) control of the elevated fluid height within the tube is facilitated (for sequential fills).

Furthermore, the overall height of the system is less than a constant inner diameter sight tube.

Figure 1:
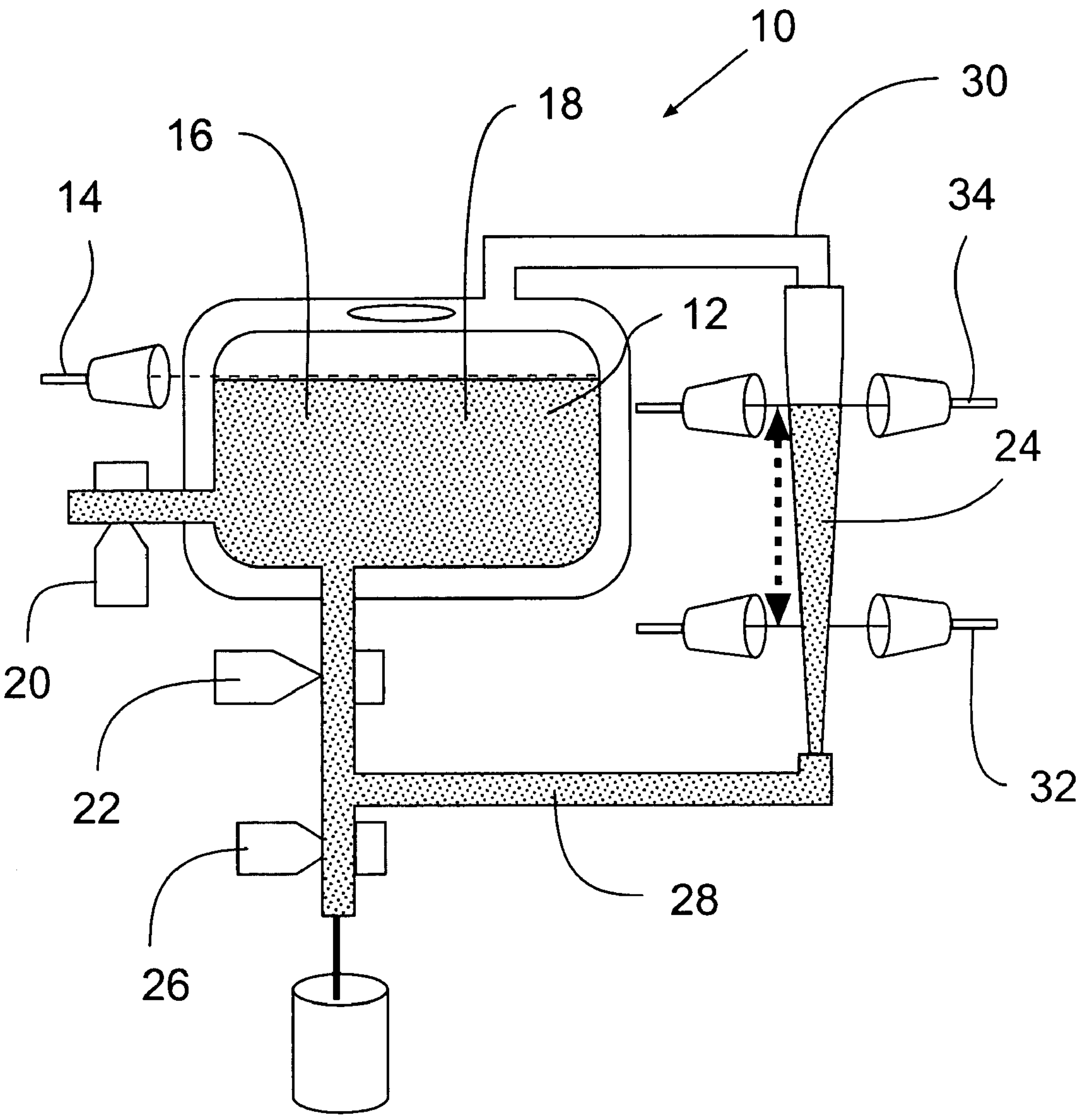
FIG. 1 is a schematic view of the fill mode of the system of this invention.
Figure 2:
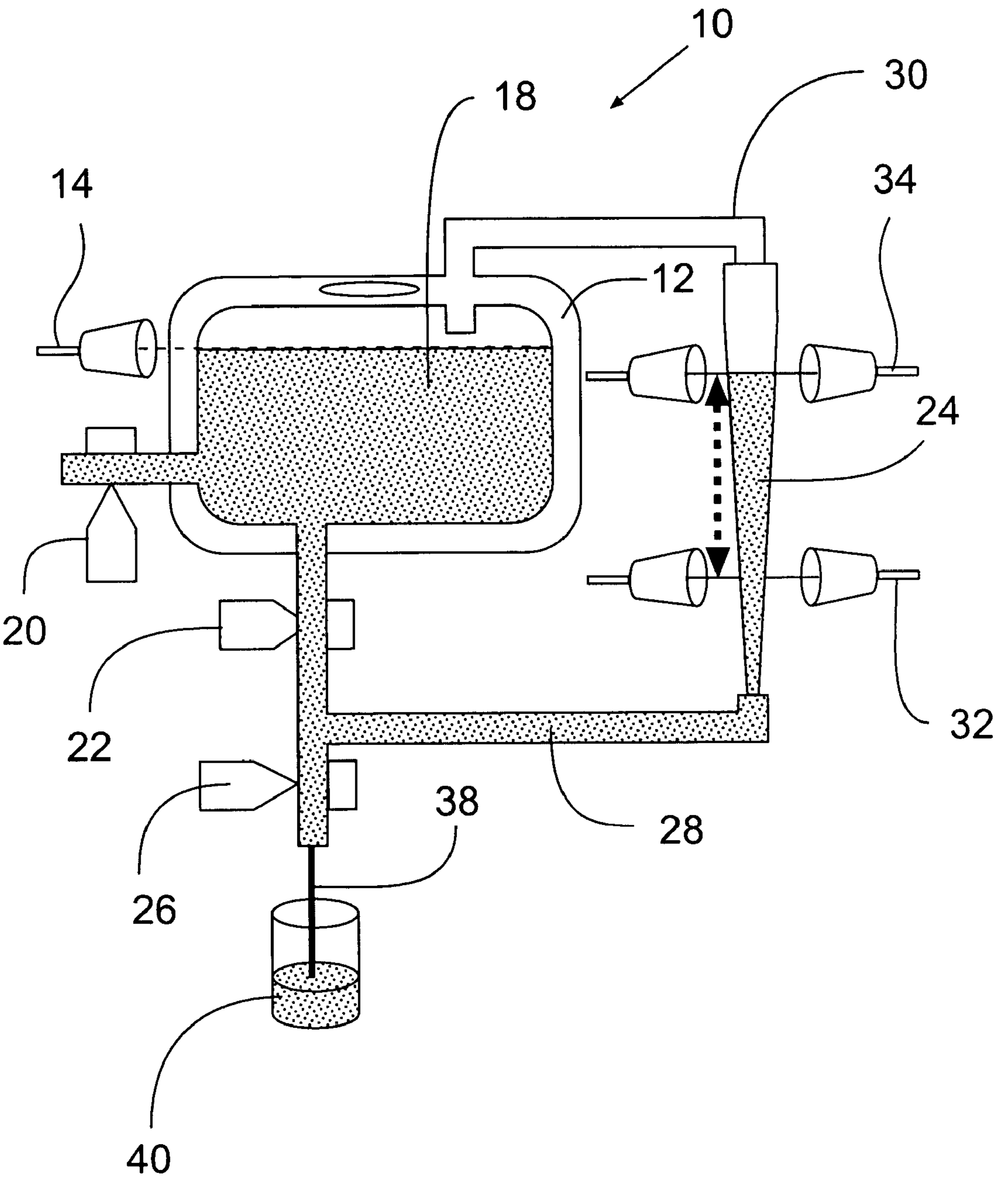
FIG. 2 is a schematic view of the dispense mode of the system of this invention.

Referring to FIGS. 1 and 2, the system of this invention is shown for filling the sight tube (FIG. 1) and for dispensing fluid from the sight tube (FIG. 2). As shown in FIG. 1, the fluid dispensing system 10 includes a fluid reservoir 12, a sensor 14 for sensing the top surface 16 (height) of the fluid reservoir 12. Fluid is supplied by any conventional means such as a pump (not shown) when valve 20 is open and valve 22 is closed. Fluid is supplied to sight tube 24 when valve 22 is open and valve 26 is closed by gravity through conduit 28 which displaces fluid in conduit 30 which is open to reservoir 12. The top surface of fluid in sight tube 24 passes through lower sensor 32 such as a light sensor and upper sensor 34 such as a light sensor. When the top surface of fluid is sensed by upper sensor 34, valve 22 is closed by conventional means activated by upper sensor 34 thereby providing a desired volume in sight tube 24 between sensor 32 and sensor 34.

When it is desired to deliver the fluid volume in sight tube 24, valve 26 is open and valve 22 is closed (FIG. 2). Valve 26 is closed when the top surface of the fluid passes lower sensor 32 in any conventional manner wherein a signal from sensor 32 activates valves 22 and 26. The fluid passes through filling needle 38 and into vial 40. By operating in this manner, the correct desired volume of fluid delivered to vial 40 can be varied by controlling the distance between sensors 32 and 34. The desired volume is the internal volume of the sight tube 24 between sensors 32 and 34. Valves 20, 22 and 26 can be conventional pinch valves which close and open flexible conduits.

Figure 3:
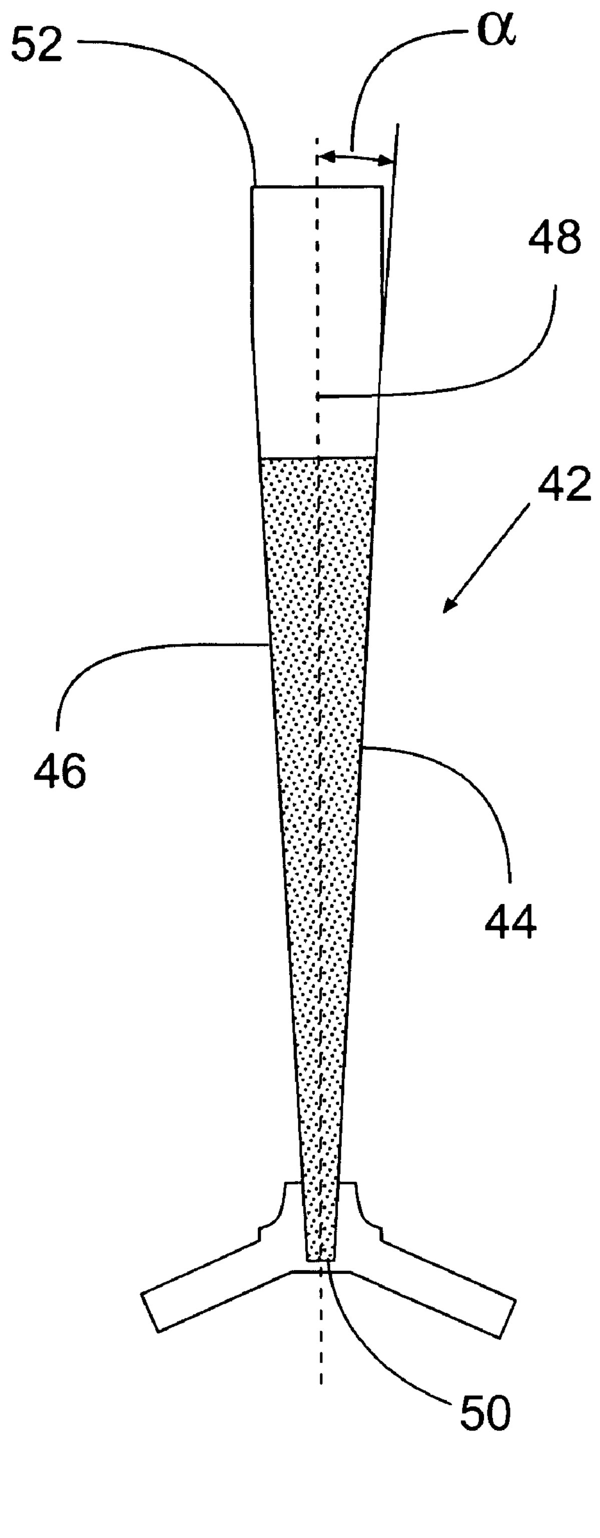
FIG. 3 is a cross-sectional view of sight tube utilized in the system of this invention.

The sight tube of the invention 42 is shown in FIG. 3. It includes opposing wall portions 44 and 46 which taper away from central vertical axis 48 from the bottom 50 to the top 52 of the sight tube 42. The angle, a between the central vertical axis 48 and either wall portion 44 or 46 is between about 1 and 10 degrees, preferably between about 2 and 4 degrees. When utilizing such tapered wall portions, an exemplary sight tube of 5 to 7 inches in height can be utilized to deliver a fluid volume range between about 0.5 and 20 ml with a tolerance of ±0.5%.

Figure 4:
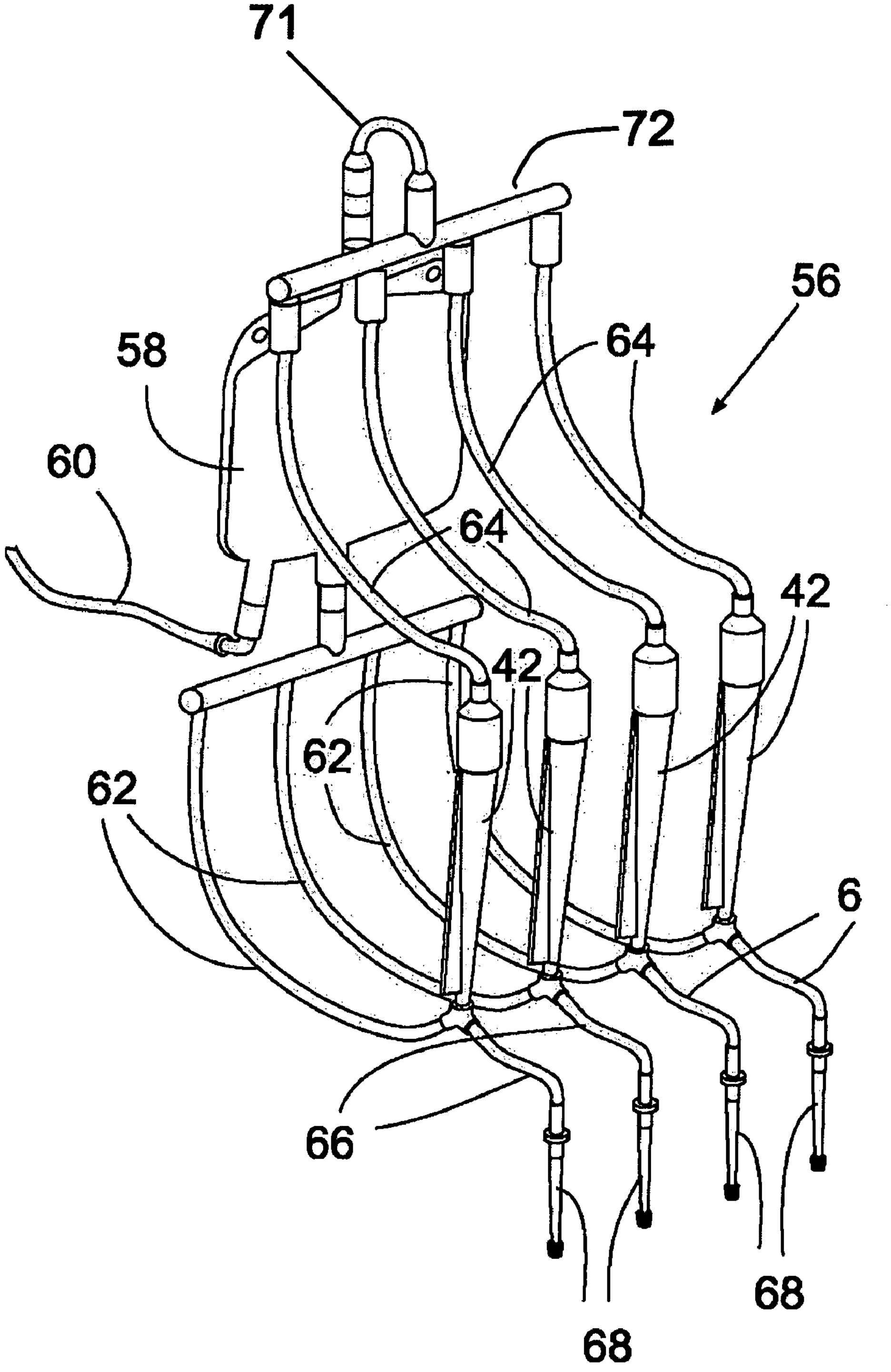
FIG. 4 is a perspective view of a multitube set that can be utilized in the present invention.

Referring to FIG. 4, a disposable multi tube set 56 (4 heads) is shown. The multi tube set 56 includes a reservoir 58 having a fluid inlet conduit 60, a single first outlet conduit 71, in fluid communication with both said reservoir and a second single conduit 72 in fluid communication with both the first outlet conduit and sight tubes 42 feed conduits 62, outlet conduits 66 and filling needles 68. The appropriate valves and sensors (See FIGS. 1 and 2) are not shown. After use, the multi tube set 56 can be disposed. It is preferred to have three or four sight tubes 42, each capable of delivering a fluid volume between about 0.5 to about 20 ml.

Figure 5:
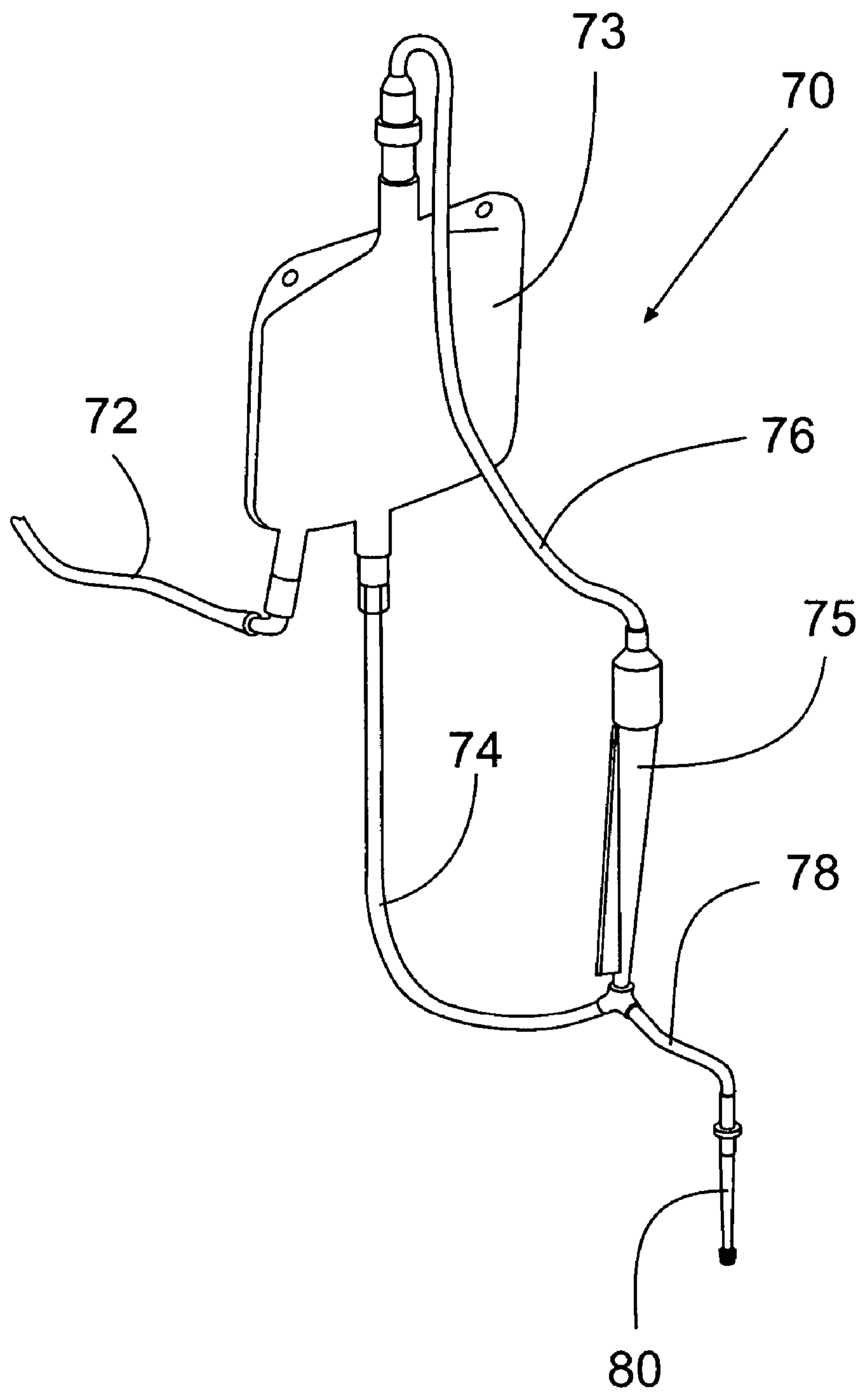
FIG. 5 is a perspective view of a single tube set that can be utilized in the present invention.

Referring to FIG. 5, a disposable single tube set (1 head) is shown. The single tube set 70 includes a reservoir 73 having a fluid inlet conduit 72, sight tube conduit 75 feed 74, outlet conduit 78 and filling needle 80. The appropriate valves and sensors (See FIGS. 1 and 2) are not shown. After use, the single tube set 56 can be disposed.

The invention claimed is:

1. A disposable tube set apparatus for delivering a precise volume of a fluid to containers which comprises:

a reservoir for a fluid, an inlet conduit to said reservoir, a single first outlet conduit in fluid communication with both said reservoir and a second single conduit, a plurality of sight tubes in fluid communication with the second single conduit, each of said sight outlet tubes having an interior wall tapered away from a central vertical axis of each of said sight outlet tubes, a return conduit connecting each of said sight outlet tubes to said reservoir, and a second outlet conduit connected to each of said sight tubes.

2. The apparatus of claim 1 having three or more sight tubes.

3. The apparatus of claim 1 having four sight tubes.

4. A system for delivering a given volume of a fluid to a container which comprises:

the disposable tube set apparatus of claim 1, a first sensor for sensing a level of fluid in a bottom portion of each of said sight tubes, a second sensor for sensing a desired level of fluid in a top portion of each of said sight tubes, a first valve means connected to said second sensor for ceasing the flow of fluid from said reservoir into said sight tube, and second valve means connected to said first sensor for ceasing fluid dispense from sight tube into said container.

5. The system of claim 4 having three or more sight tubes.

6. The system of claim 4 having four sight tubes.

7. The apparatus of any one of claims 1, 2, or 3 wherein the angle between said interior wall and said central vertical axis is between about 2 and 4 degrees.

8. The system of any one of claims 4, 5, or 6 wherein the angle between said interior wall and said central vertical axis is between about 2 and 4 degrees.

9. The apparatus of claim 1, wherein the sight tube has a volume ranging from 0.5 ml to 20 ml.

10. The apparatus of claim 1, wherein the sight tube has a height ranging from 5 to 7 inches.

11. The apparatus of claim 1, wherein the sight tube has a tapered wall ranging from about 1 to about 10 degrees from a central vertical axis of the sight tube.

12. The system of claim 6, further comprising a third sensor for sensing the fluid level in the reservoir.

* * * * *